Figure 1:
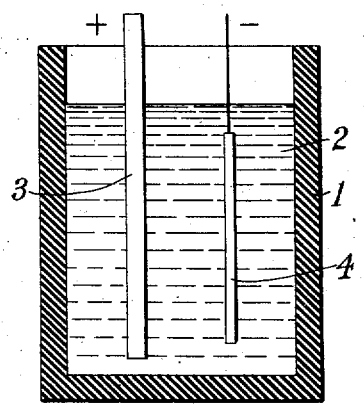

No. 12,301. REISSUED JAN. 3, 1905.

A. G. BETTS.

PROCESS OF ELECTROLYTICALLY REFINING LEAD.

APPLICATION FILED APR. 22, 1903.

Witnesses:
Raphael Netter
S. S. Dunham.

Anson G. Betts, Inventor
by Kerr, Page & Cooper, Att'ys

No. 12,301. Reissued January 3, 1905.

UNITED STATES PATENT OFFICE.

ANSON GARDNER BETTS, OF LANSINGBURG, NEW YORK.

PROCESS OF ELECTROLYTICALLY REFINING LEAD.

SPECIFICATION forming part of Reissued Letters Patent No. 12,301, dated January 3, 1905.

Original No. 713,277, dated November 11, 1902. Application for reissue filed April 22, 1903. Serial No. 153,877.

*To all whom it may concern:*

Be it known that I, ANSON GARDNER BETTS, a citizen of the United States, residing at Lansingburg, county of Rensselaer, and State of New York, have invented a certain new and useful Process for the Electrolytic Refining of Lead and Lead Alloys, of which the following is a specification.

The present invention relates to the art or process of electrolytic refining of lead and lead alloys.

The lead resulting from electrolysis by methods heretofore commonly employed is characterized by lack of density, incoherency, and by a crystalline spongy formation, rendering the electrodeposit unsuitable for fusion.

The object of my invention is to produce by electrolytic treatment substantially pure lead having substantially the density and homogeneity of cast-lead. Such object is attained by the employment, in connection with a suitable electrolyte, of an agent capable of restraining the crystallization of the deposit.

To carry out my invention, I employ any suitable electrolyte—such as, for example, a solution of a lead salt of a fluorin acid, as described in United States Letters Patent No. 679,824, granted to me August 6, 1901. The use of a salt of a fluorin acid for the electrolyte is suitable because of its well-known characteristics of being strongly dissociating and of having no oxidizing and reducing effect on the electrodes. In my prior patent above mentioned I have described the electrolyte which I prefer to use as follows: By the term "fluorin acid" I mean to include all the acid fluorin compounds of those acid-forming elements which are less easily separated from their solutions by electrolysis than lead is. A fluorin acid is defined as an acid which may be derived from an oxygen acid by the simple replacement of the oxygen wholly or in part by fluorin, two atoms of fluorin replacing one of oxygen. The fluorin acid of silicon, for instance, may be derived from silicic acid and water ($SiO_2$ and $H_2O$ or $H_2SiO_3$) by replacing oxygen by fluorin, resulting in fluosilicic acid, ($H_2SiF_6$.) I have ascertained by experiment that a solution of a lead salt of such an acid constitutes an electrolyte which can be used for the electrolytic refining of lead with the consumption of a small amount of electrical energy, the electrolysis of which in electrically refining lead will not cause the production of any lead peroxid on the anode and which is itself not subject to decomposition or deterioration by secondary electrolysis. Further, the lead salts of such fluorin acids are very soluble in water and their solutions afford electrolytes of high conducting power. The acid fluorin compound of silicon or fluosilicic acid, ($H_2SiF_6$,) often called "hydrofluosilicic acid," which may be made by the simple solution of silica or quartz in hydrofluoric acid, is the fluorin acid which I prefer to use in carrying out my improved process. The hydrofluosilicic acid may contain some silicic acid ($SiO_2$) without materially affecting the result, such silicic acid probably being in combination with fluosilicic acid in the form of an oxyfluosilicic acid, ($H_2SiF_4O$.) The equation representing its formation would be $$2H_2SiF_6+SiO_2+H_2O=3H_2SiF_4O.$$

I prefer to have the electrolytic solutions strongly acid from the presence of an excess of fluosilicic acid, which prevents the formation of basic insoluble salts and results in a higher electrical conductivity.

To the electrolyte is added a quantity of a reducing agent, which I have found materially improves the deposited lead. Among the substances which I have found available for such purpose are gelatin, pyrogallol, resorcinol, saligenin, ortho-amido-phenol, hydroquinone, and sulfurous acid. Phenols of the aromatic series are well adapted for use in the present process by reason of their being easily oxidizable. The improvement in the electrodeposit is believed to be due to the reducing action of the agent employed.

The agent contained in the electrolyte, as above stated, serves to restrain the crystallization of the electrodeposited lead and causes the same to form at or upon the cathode in a solid coherent body of substantially uniform structure throughout, having substantially the density and homogeneity of cast-lead, constituting a product which by reason of its physical properties facilitates the practical electrolytic refining operations and which may be fused without the formation of an undue amount of dross. By the present process I am able to produce without mechanical treatment a deposit that can be made of considerable thickness and which is non-porous, as shown by the specific gravity of a mass of it. A product is easily made with a specific gravity of 11.36, the same metal remelted and cast having the same density. I have observed with some of the more active of these agents, as gelatin and pyrogallol, the projections that always occur on thick electrodeposits are nodular, while with some of the weaker agents, as ortho-amido-phenol and saligenin, the projections are apt to be crystals. When the projections are nodular, they swell into lumps on the surface during electrolysis, reducing the liability of short-circuiting during practical working of the process. With the crystalline form of projection short-circuiting occurs, rendering such deposits less desirable or suitable for electrolytic refining or electroplating, although the deposit is superior to that obtained by prior electrolytic processes. There appears to be a very slight increase in the weight of the lead deposit in connection with the use of the above agents. These agents also affect to some extent the solution of lead at the anode by preserving the mass of solid lead underneath the anode slime with a somewhat smoother surface.

In practicing my present invention I prefer a current strength of ten to twenty amperes per square foot of cathode surface and a corresponding tension of .15 to .35 volts for each element. With higher currents the lead becomes harder and more brittle and takes on a whitish color and silvery luster. A sample deposited with a current of forty amperes per square foot showed a specific gravity of 11.276. In general the deposited lead is apt to be slightly stiffer than ordinary lead; but this stiffness may be regulated at will by varying the current density and the quantity of agent in the solution.

Of the above-named agents I have found gelatin the cheapest and to give the best results and prefer its use in the proportion of one part of gelatin, by weight, to five thousand parts of solution. The current efficiency does not appear to be affected by the presence of gelatin or of any of the other named agents in the electrolyte. The agent may be applied to the electrolyte in such quantities as desired from time to time. If gelatin is used, it is dissolved in hot water and a sufficient quantity of this solution added to the electrolyte so as to make the desired proportion.

My improved method is well adapted for electroplating metal bodies with lead, as the electrodeposit forms thereon a firmly-adherent dense coating of lead. The body to be electroplated may be of any desired form.

The present process for directly producing lead of a quality for remelting is of great importance in the electrolytic refining of lead as well as in the art of electroplating, as it removes one of the obstacles in the electrolytic refining of lead —namely, the unsuitability of lead products of prior processes for remelting and for maintaining without attention the proper conditions of work in the refining-tanks—that is, without short-circuiting. As the electrodeposit is not mechanically treated while being formed by the present process, it retains undisturbed the normal structural characteristics due to electrolysis. The appearance of the surface of the deposit changes as the electrolysis proceeds, beginning with a frosty appearance and becoming coarser until it has a pebbly or botryoidal appearance.

Any suitable electrolytic apparatus may be employed to carry out the present process. I have shown one form of apparatus in the accompanying drawings, in which—

Figure 2:
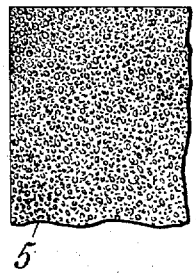
Figure 3:
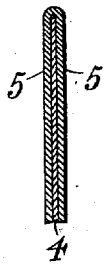

Figure 1 is a vertical cross-section of the apparatus employed in treating lead by my improved process. Fig. 2 is a plan view of a metallic plate electroplated with lead by my improved process, the plate being partly broken away. Fig. 3 is a vertical cross-section of the same.

1 is the electrolytic vat containing the electrolyte 2, with a restraining agent, as above described.

3 is the anode, and 4 the cathode, suspended in the electrolyte and connected with the respective poles of an electric energizer. (Not shown.) The anode consists of lead or lead alloy to be refined. The cathode is shown of a metallic plate suspended in position to be electroplated with lead by my improved method.

5 represents the electrodeposited lead having the characteristics above described.

What I claim, and desire to secure by Letters Patent, is—

1. The process of electrodepositing lead, which consists in subjecting to electrolysis an electrolyte containing a lead salt of a fluorin acid, and an agent capable of restraining the crystallization of the electrodeposited lead.

2. The process of electrodepositing lead consisting in subjecting to electrolysis an electrolyte containing in solution a lead salt of a fluorin acid and a reducing agent.

3. The process of electrodepositing lead consisting in subjecting to electrolysis an electrolyte, containing in solution a lead salt of a fluorin acid and gelatin.

4. The process of electrodepositing lead consisting in subjecting to electrolysis an electrolyte containing in solution lead fluosilicate and gelatin.

5. The process of electrodepositing lead, which consists in subjecting to electrolysis an electrolyte containing an acid which is strongly dissociating and which has of itself no oxidizing or reducing action on the electrodes; a lead salt of the said acid; and an agent capable of preventing the crystallization of the lead deposit, as set forth.

6. The process of electrodepositing lead, which consists in subjecting to electrolysis an electrolyte containing in solution a strongly-dissociating acid, which forms a readily-soluble salt of lead and which has of itself no oxidizing or reducing action on the electrodes; a lead salt of the said acid; and a reducing agent capable of restraining the crystallization of the electrodeposited lead, as set forth.

In testimony whereof I have signed my name to this specification in the presence of two subscribing witnesses.

ANSON GARDNER BETTS.

Witnesses:
JOHN H. SOUTHWORTH,
F. P. COLE.